2,872,465

METHOD OF PROCESSING SOYBEAN OIL TO RETARD FLAVOR REVERSION

Rex J. Sims, La Grange, Karl F. Mattil, Downers Grove, and Werner J. Lehmann, Chicago, Ill., assignors to Swift & Company, Chicago, Ill., a corporation of Illinois No Drawing. Application November 10, 1954
Serial No. 468,152

4 Claims. (Cl. 260—423)

This invention relates to a process for retarding the development of reversion flavor in soybean oil on standing of that oil for prolonged periods.

Soybean oil, even when hydrogenated, has somewhat limited use in the manufacture of edible products because of the tendency of the oil to develop in short order an objectionable off-flavor. Soybean oil, except for this undesirable characteristic, would be more widely used in the manufacture of food stuffs, for it is a relatively low-cost oil and is available in large quantities. It is known that even substantially complete hydrogenation of soybean oil will not wholly prevent the reversion flavor. This reversion flavor is frequently noticed long before rancidity develops.

Flavor reversion is associated with soybean oil that has been subjected to conventional steam deodorization and is generally not considered to occur in non-deodorized oils. Flavor reversion differs from rancidity and will take place at very low levels of oxidation.

It is an object of the present invention to provide a method for retarding the development of reversion flavor which develops upon the storage of soybean oil.

We have found that in the processing of a soybean oil intended for the incorporation into an edible food stuff that the contacting of the oil with a small amount of certain mild oxidizing agents will yield an oil in which the development of the reversion flavor is substantially retarded. Potassium dichromate, potassium permanganate, or dilute aqueous solutions of nitric acid may be successfully employed for this purpose.

In the instance of potassium dichromate, our preferred treating reagent, the reagent may be added before, during, or subsequent to the caustic refining step to which all vegetable oils are customarily subjected. Neither nitric acid nor potassium permanganate should be incorporated in the oil during caustic refining but may be added either prior to or following refining. Preferably these latter two reagents are incorporated in the water wash of the conventional degumming operation.

For satisfactory results it has been our experience that alkali refining from the practical standpoint is a necessary step for the reason that failure to include it will leave fatty acids in the oil which will cause reversion of the oil and a "masking" of the advantage that may be gained through treatment with a mild oxidizing reagent.

It is contemplated that in plant operation the method of our invention may be readily made a part of the processing to which oils are now conventionally subjected, with little, if any, additional equipment needed, since the treating reagent may be conveniently added to the water used in degumming, and, in the case of potassium dichromate, if desired, to the caustic employed in refining as well.

The preferred temperature range is from about 120° to 160° F. However, from our observations, temperatures less than 120° F. and as low as 70° F. may be employed with decreasing efficiency.

Amounts of the treating reagent as low as 0.01 percent based on the weight of the oil have been found to be effective in delaying the development of reversion flavor. One percent of the treating reagent by weight is considered the upper practical limit, with the preferred range being 0.03–0.2 percent.

The method of our invention has been demonstrated to be successful, both in the laboratory and on a pilot plant scale, as evidenced by the following examples. These examples illustrate the effectiveness of our method of processing and the advantages to be gained in the use of it. The taste evaluations are those of a flavor panel made up in most instances of seven individuals whose individual scores were averaged to give the flavor ratings shown. A rating of 9 or 10 is good, and with such a rating the off-flavor is not detectable. In the case of ratings of 8 and 7, the off-flavor is only slightly detectable, and ratings of 6 and less indicate that the particular sample graded was definitely off in flavor. Ratings of the value of 4 and 3 are considered to be objectionably strong, while ratings of 1 and 2 are repulsive.

The same lot of crude soybean oil having a free fatty acid content of 0.65 percent was used for the Examples I–III, inclusive. In each instance the oil, after being degummed and/or refined as the case may be, was deodorized for five hours at 220° C. and 1 mm. pressure and stabilized with 0.005 percent citric acid. All samples were then stored in amber glass bottles at 75° F. for a period of 58 days, and following this long storage each sample was heated to 140° F. and held there for 24 hours to accelerate flavor deterioration. In Example I the potassium dichromate was added in a neutral aqueous solution, while in Example II the oil was treated with the dichromate during caustic refining. In Example III the potassium dichromate was added to the oil in an acidified aqueous solution.

As controls for these three examples, two portions of the same soybean oil were subjected to the following treatment: One sample of the oil (3 kg.) was degummed at 150° F. by stirring with 90 ml. of water, and subsequently refined at 150° F. with 50 grams of 11 percent caustic. The refined oil was then earth bleached and deodorized. The flavor panel found this oil to have a flavor rating of 7 on the 28th day of storage at 75° F., and on the 58th day, a value of 6. The lot of soybean oil used in the Examples I–III had an initial flavor rating of 9.

The second control was a 3 kg. sample of the same crude soybean oil which was simply refined at 150° F. with 50 grams of 11 percent caustic, and then earth bleached and deodorized. This sample was also stored at 75° F. and was found on the 28th day to have a flavor rating of 8 which decreased to 6 on the 58th day.

Flavor reversion is more troublesome in soft, unhydrogenated oils, and consequently the following tests, which are concerned with unhydrogenated oils, are a severe evaluation of our process.

In each of the following examples, 3 kg. samples of the above-described crude soybean oil were used:

Example I

The oil of this example was degummed at 150° F. by stirring with 90 ml. of 3 percent aqueous potassium dichromate. The degummed oil was then refined at 150° F. with 50 grams of 11 percent caustic, and earth bleached. The flavor panel rated this oil on the 28th day of storage at 8.5. On the 58th day the rating of 8 was given. It will be noted that this is a vast improvement over the two controls, both of which had gone off flavor to 6 on the 58th day of storage. To accelerate flavor deterioration, this sample was heated for 24 hours at 140° F. The flavor panel gave the oil so treated a rating of 5.

Example II

The crude soybean oil of this example was refined at

150° F. with 50 grams of 11 percent caustic containing 3 grams of dissolved potassium dichromate. Following refining, the sample was earth bleached. This sample on the 28th day of storage had a rating of 9. After 58 days of storage the rating dropped to 8. Again to accelerate flavor deterioration, the sample was subjected to heating at 140° F. for 24 hours. Even after this abusive treatment, the oil still retained an acceptable rating of 8. This sample strikingly demonstrates the advantages to be gained in the practice of our invention.

*Example III*

Another 3 kg. sample of the same crude soybean oil was degummed at 150° F. with 90 ml. of acidified 3 percent aqueous potassium dichromate, and then refined at 150° F. with 50 grams of 11 percent caustic. Following this, the refined oil was earth bleached. The sample was given a flavor rating of 9 by the panel on the 28th day, and a rating of 8 by the 58th day of storage. The sample, like the samples of first two examples, was then heated at 140° F. for 24 hours to develop rapid differences. The oil, after subjection to this severe treatment, fell off flavor to a 7.

*Example IV*

In this example a 3 kg. sample of another crude soybean oil was degummed at 160° F. by stirring it slowly for 20 minutes with 100 ml. of a 1 percent aqueous potassium permanganate solution. The mixture stood overnight at room temperature and the following morning the oil was decanted from the gums. Another 3 kg. sample of this same oil was degummed in a similar manner with simply 100 ml. of water. Both oils were refined with excess caustic, there being 4 grams of sodium hydroxide added in water to reduce the initial 0.5 percent free fatty acids. The oil of each sample was decanted from the foots, filtered at 90° C., and then bleached at 110° C. by stirring for 5 minutes with 5 percent by weight of Bennett-Clark earth and 0.5 percent of activated carbon. The bleached oils were deodorized concurrently in glass equipment for 5 hours at 205° C. and 1 mm. pressure. Both of the samples so treated had good color, flavor, and odor. For the purpose of accelerating flavor deterioration, each of the samples was held at 140° F. for 24 hours. The control oil was badly off flavor following this abusive treatment, while the permanganate sample was given an acceptable flavor rating. After five days at this elevated temperature the permanganate sample was somewhat grassy but still considerably better than the control.

*Example V*

Three equal portions (700 g. each) of still another crude soybean oil were degummed at 160° F. by stirring for 10 minutes with 21 ml. of the following reagents: 1 percent nitric acid (reagent grade nitric acid diluted with 99 parts of water), 1 percent aqueous potassium dichromate solution, and 1 percent aqueous potassium permanganate solution. As a control, another sample of the crude oil was degummed simply with 21 ml. of water.

The degummed oils were then refined, bleached, and deodorized as described in Example IV. The deodorized oils of all four samples of this example were found to have bland flavors and odors. Samples of each were stored in glass jars at 140° F. for 24 hours. The abusive high-temperature treatment caused all samples to go off flavor to some extent. The control (water degummed) had the most disagreeable flavor of all, and the flavor panel listed the several oils in order of decreasing flavor preference as follows: nitric acid, potassium dichromate, potassium permanganate control.

*Example VI*

A 700-gram sample of bleached soybean oil was washed with 21 ml. of a 1 percent potassium dichromate solution by stirring for 5 minutes at 160° F. After one hour of settling, the oil was decanted, heated to 180° F., and filtered. The filtered oil was then bleached at 220° F. by stirring for 5 minutes with 5 percent by weight of Bennett-Clark earth. The oil so treated and a sample (control) of the same oil which had not been washed with the potassium dichromate solution were deodorized concurrently for 5 hours at 200° C. and 1 mm. pressure. Before cooling, 0.005 percent citric acid was added in an alcoholic solution to each of the two samples. Upon cooling, the two samples were found to be both odorless and bland in taste. On storage at 140° F. the control reverted badly in 24 hours, whereas the washed oil retained a pleasant flavor. After two days at this high temperature both oils had bad off flavors, but the washed sample was still much to be preferred.

*Example VII*

In addition to the above-described laboratory tests, an experiment has also been run in a refinery pilot plant for the purpose of demonstrating the value of our process when employed on a large scale. A 3000-pound batch of crude soybean oil was degummed with 3 percent by weight (90 lbs.) of a 1 percent potassium dichromate solution at a temperature of 140° F. The gums were settled for one hour and then drawn off. The degummed oil was refined, using a 1.5 percent excess of 12 Baume caustic over that required to neutralize the free fatty acid content. The caustic was added to the oil at 140° F. with slow agitation, and stirred until a good break of the foots had been obtained, and then allowed to settle for two hours. After the soapstock (foots) had been drawn off, the oil was pumped to another tank and washed with 15 percent by weight of water at 180° F. It was settled for one hour, the water was drawn off, and the oil then dried at 220° F. with agitation. Following this, the oil was bleached with 1 percent by weight of Bennett-Clark earth and filtered with 0.5 percent Filtercel. Following filtering, the oil was drawn into a hydrogenator for hardening. To 2400 lbs. of this oil there was added 3.5 lbs. of Rufert catalyst. The oil was subjected to hydrogenation under a pressure of 5 lbs. per square inch at a temperature of 400-405° F. to a final iodine number of 69.4. The hydrogenated oil was then filtered with Bennett-Clark earth and subsequently deodorized for 5 hours at 400° F. with 90 lbs. of stripping steam. A small amount of citric acid was added to assist in stabilization of the oil. This process was then repeated for a control oil, with the sole difference that water was used for degumming rather than the aqueous potassium dichromate solution. The oil, degummed solely with water, had a final iodine number of 73.9.

Both the control and the dichromate sample had good odors and flavors upon completion of processing. Samples of each oil were stored at 140° F. On completion of the second day of storage, the water-degummed sample had a flavor rating of 7— and the dichromate sample a rating of 8. After four days at the elevated temperature the water-degummed sample had gone off flavor to a rating of 2 while the dichromate sample still had an acceptable rating of 7.

Obviously, many modifications and variations of the invention as hereinbefore set forth may be made without departing from the spirit and scope thereof, and therefore only such limitations should be imposed as are indicated in the appended claims.

We claim:

1. In the processing of soybean oil suitable for incorporation in an edible food stuff and wherein the oil is subjected to a refining operation to separate the free fatty acids therefrom and to a vacuum deodorization operation, the step of treating an unhydrogenated soybean oil with a mild oxidizing agent selected from the group consisting of dilute nitric acid, potassium dichromate, and potassium permanganate, in an amount from about 0.01% to about 0.5% based on the weight of the oil to substantially retard the development of a reversion flavor in said oil, said treatment being carried on at a temperature within the range of about 70° to 160° F.

2. In the processing of soybean oil to be incorporated in an edible food stuff, the step of treating an unhydrogenated soybean oil with an amount of potassium dichromate of from about 0.01% to about 0.5% based on the weight of the oil to substantially retard the development of a reversion flavor in said oil, said treatment being carried on at a temperature within the range of about 120°–160° F., and subjecting said oil during processing to a refining step to separate the free fatty acids therefrom and to a vacuum deodorization operation to produce a product having a bland flavor as distinguished from the objectional flavor characteristics of raw soybean oil.

3. In the processing of soybean oil to be incorporated in an edible food stuff, the step of treating an unhydrogenated soybean oil with an amount of potassium permanganate of from about 0.01% to about 0.5% based on the weight of the oil to substantially retard the development of a reversion flavor in said oil, said treatment being carried on at a temperature within the range of about 120°–160° F., and subjecting said oil during processing to a refining step to separate the free fatty acids therefrom and to a vacuum deodorization operation to produce a product having a bland flavor as distinguished from the objectional flavor characteristics of raw soybean oil.

4. In the processing of soybean oil to obtain an edible food stuff, the step of contacting an unhydrogenated soybean oil with a dilute solution of nitric acid in an amount of from about 0.01% to about 0.5% based on the weight of the oil to substantially retard the development of a reversion flavor in said oil, said treatment being carried on at a temperature within the range of about 120°–160° F., and subjecting said oil during processing to a refining step to separate the free fatty acids therefrom and to a vacuum deodorization operation to produce a product having a bland flavor as distinguished from the objectional flavor characteristics of raw soybean oil.

References Cited in the file of this patent
UNITED STATES PATENTS

| | | |
|---|---|---|
| 306,324 | Davis | Oct. 7, 1884 |
| 2,133,894 | Hodgins | Oct. 18, 1938 |
| 2,308,848 | Young et al. | Jan. 19, 1943 |